United States Patent
Song et al.

(10) Patent No.: US 7,482,962 B2
(45) Date of Patent: Jan. 27, 2009

(54) SYSTEMS, METHODS, AND APPARATUSES FOR DIGITAL WAVELET GENERATORS FOR MULTI-RESOLUTION SPECTRUM SENSING OF COGNITIVE RADIO APPLICATIONS

(75) Inventors: Taejoong Song, Atlanta, GA (US); Jongmin Park, Atlanta, GA (US); Youngsik Hur, Alpharetta, GA (US); Kyutae Lim, Alpharetta, GA (US); Chang-Ho Lee, Marietta, GA (US); Jeongsuk Lee, Kyunggi (KR); Kihong Kim, Kyunggi (KR); Seongsoo Lee, Kyunggi (KR); Haksun Kim, Daejeon (KR); Joy Laskar, Marietta, GA (US)

(73) Assignees: Samsung Electro-Mechanics, Gyunggi-Do (KR); Georgia Tech Research Corp., Atlanta, GA (US)

( * ) Notice: Subject to any disclaimer, the term of this patent is extended or adjusted under 35 U.S.C. 154(b) by 13 days.

(21) Appl. No.: 11/778,565

(22) Filed: Jul. 16, 2007

(65) Prior Publication Data
US 2008/0034171 A1 Feb. 7, 2008

Related U.S. Application Data

(60) Provisional application No. 60/820,757, filed on Jul. 28, 2006.

(51) Int. Cl.
*H03M 1/66* (2006.01)
(52) U.S. Cl. .................... 341/144; 341/155
(58) Field of Classification Search .......... 341/144, 341/155; 348/87, 441, 458; 345/89, 204
See application file for complete search history.

(56) References Cited

U.S. PATENT DOCUMENTS

| | | | | |
|---|---|---|---|---|
| 4,242,936 A * | 1/1981 | Swain | ................ | 84/635 |
| 5,267,045 A * | 11/1993 | Stroomer | ................ | 348/441 |
| 5,379,410 A * | 1/1995 | Okada | ................ | 714/8 |
| 5,530,676 A * | 6/1996 | Sullivan et al. | ................ | 365/189.15 |
| 5,675,523 A | 10/1997 | Noda | | |
| 6,211,918 B1 * | 4/2001 | Uwabata et al. | ................ | 348/458 |
| 7,212,193 B2 * | 5/2007 | Ueda | ................ | 345/204 |
| 7,271,791 B2 * | 9/2007 | Yamazaki | ................ | 345/89 |
| 2005/0117017 A1 * | 6/2005 | Baer | ................ | 348/87 |

FOREIGN PATENT DOCUMENTS
GB  2224899 A  5/1990

OTHER PUBLICATIONS
Search Report for GB0714749.9 dated Nov. 22, 2007.

* cited by examiner

*Primary Examiner*—Peguy JeanPierre
(74) *Attorney, Agent, or Firm*—Sutherland Asbill & Brennan LLP

(57) ABSTRACT

Embodiments of the invention may provide for digital wavelet generators utilized in providing flexible spectrum-sensing resolutions for a Multi-Resolution Spectrum Sensing (MRSS) technique. Embodiments of the invention may provide for either multi-point or multi-rate digital wavelet generators. These digital wavelet generators may utilizing the same hardware resource optimally, and the various wavelet bases may be generated by changing the memory addressing schemes or clock speeds.

20 Claims, 6 Drawing Sheets

| Characteristics | MP-DWG | MR-DWG |
|---|---|---|
| $N_{hor}$ (# of points) | Varying | Fixed |
| Sampling frequency | Fixed | Varying |
| RAM depth | Oversized | Optimized |
| RAM address accessing logic | Varying | Fixed |
| RAM clock logic | Fixed | Varying |
| Reconstruction filter | Fixed | Varying |

FIG. 6

SYSTEMS, METHODS, AND APPARATUSES FOR DIGITAL WAVELET GENERATORS FOR MULTI-RESOLUTION SPECTRUM SENSING OF COGNITIVE RADIO APPLICATIONS

RELATED APPLICATION

This application claims priority to U.S. Provisional Ser. No. 60/820,757, entitled "Systems, Methods, and Apparatuses for a Digital Wavelet Generator (DWG) for Multi-Resolution Spectrum Sensing of Cognitive Radio Applications," filed on Jul. 28, 2006, which is incorporated by reference as if fully set forth herein.

FIELD OF THE INVENTION

The present invention relates generally to digital wavelet generators.

BACKGROUND OF THE INVENTION

Spectrum sensing is a key function for Cognitive Radio (CR) systems. In order to provide flexible spectrum-sensing resolutions, a wavelet basis may be used in order to adjust one or more spectrum-sensing resolutions. Prior wavelet generators used in generating the wavelet basis are limited in that they must individually store a plurality of predetermined wavelet bases or otherwise cannot easily change the resolution of the wavelet basis. Moreover, these prior wavelet generators oftentimes require complex hardware that may involve significant costs and processing time. Accordingly, there is a need in the industry for a more flexible digital wavelet generator.

BRIEF SUMMARY OF THE INVENTION

According to an embodiment of the invention, there is a method for a multi-point digital wavelet generator comprises storing each of a plurality of digitized data points of a high-resolution wavelet basis in one of a plurality of rows of a memory, determining skipped rows and non-skipped rows of the plurality of rows of the memory based upon an address skip interval, retrieving digitized data points from each non-skipped row of the memory, and processing the retrieved digitized data points from each non-skipped row in accordance with a clock frequency to generate an analog wavelet basis, wherein a duration of the analog wavelet basis is determined based at least in part upon the address skip interval and the clock frequency.

In accordance with another embodiment of the invention, a method for a multi-rate digital wavelet generator comprises storing each of a plurality of digitized data points of a high-resolution wavelet basis in one of a plurality of rows of a memory, determining a clock frequency, retrieving digitized data points from each row of the memory; and sequentially processing the retrieved digitized data points from each row in accordance with the determined clock frequency to generate an analog wavelet basis, wherein the duration of the analog wavelet basis decreases as the clock frequency increases.

In accordance with yet another embodiment of the invention, a multi-point digital wavelet generator comprises a memory for storing each of a plurality of digitized data points of a high-resolution wavelet basis in one of a plurality of rows of a memory, an addressing scheme having an address skip interval, wherein the address skip interval determines skipped rows and non-skipped rows of the plurality of rows of the memory, an digital-to-analog converter (DAC) that receives digitized data points from each non-skipped row of the memory, wherein the DAC processes the received digitized data points from each non-skipped row in accordance with a clock frequency to generate an analog wavelet basis, wherein a duration of the analog wavelet basis is determined based at least in part upon the address skip interval and the clock frequency.

In yet another embodiment of the invention, a multi-rate digital wavelet generator comprises a memory for storing each of a plurality of digitized data points of a high-resolution wavelet basis in one of a plurality of rows of the memory, a clock having a selectable clock frequency, and a digital-to-analog (DAC) converter that receives the digitized data points from each row of the memory, wherein the DAC sequentially processes the received digitized data points from each row in accordance with the selected clock frequency to generate an analog wavelet basis, wherein the duration of the analog wavelet basis decreases as the clock frequency increases.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6 illustrates a table of characteristics comparison of two proposed inventions, MP-DWG and MR-DWG.

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
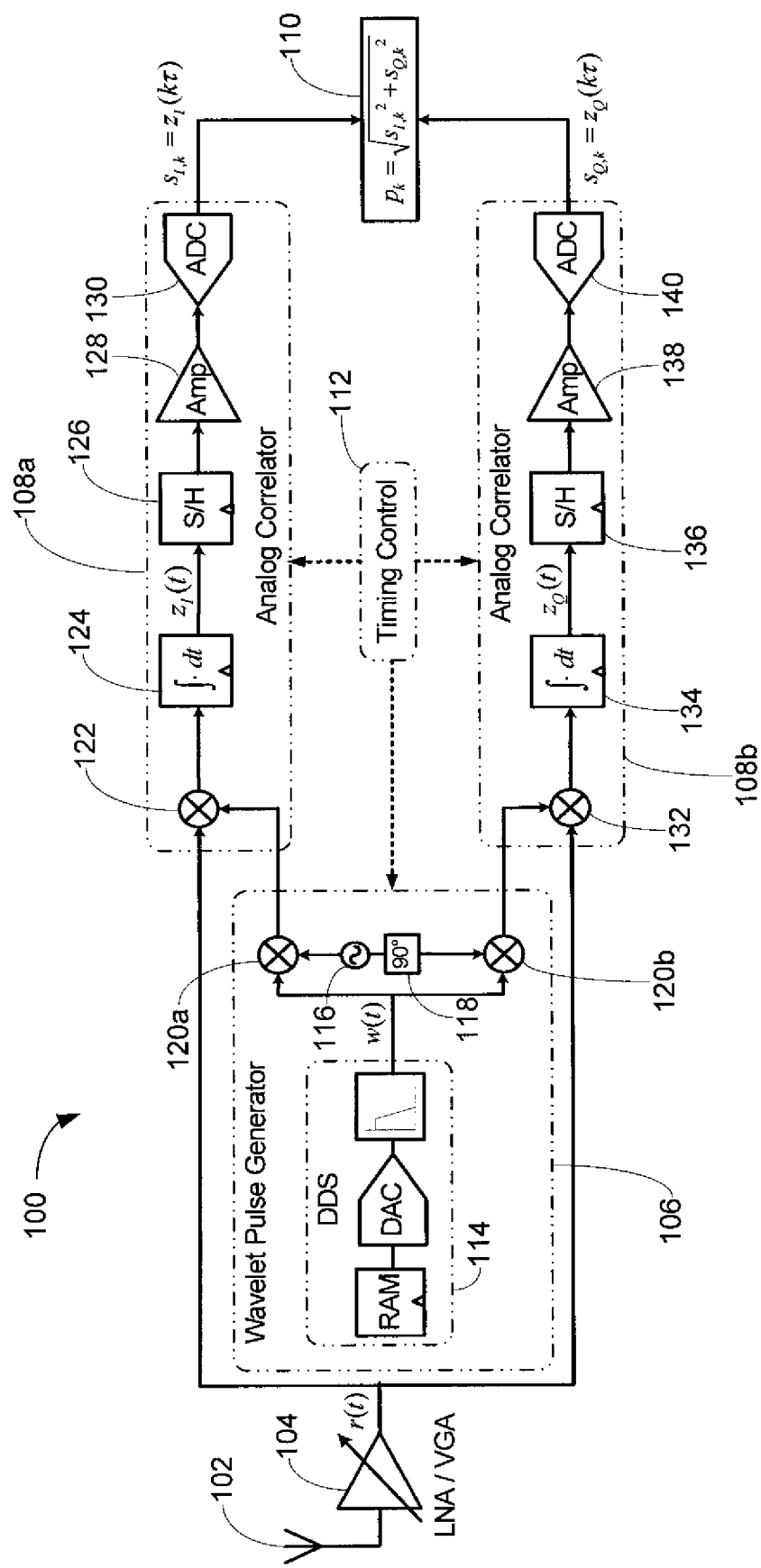
FIG. 1 illustrates simplified diagram of Multi-Resolution Spectrum Sensing (MRSS) system for cognitive radio, according to an example embodiment of the invention.

Operating Environment Overview. FIG. 1 illustrates an example of an operating environment for a digital wavelet generator (DWG) 114 within a system 100 that provides for a Multi-Resolution Spectrum Sensing (MRSS) in accordance with an example embodiment of the invention. In particular, the system 100 of FIG. 1 may generally include, but is not limited to, an antenna 102, an amplifier 104, a wavelet pulse generator 106, analog correlators 108a and 108b, a medium access control (MAC) module 110, and timing control 112.

According to an exemplary embodiment of the present invention, the antenna 102 may be a wideband antenna operable over a wide frequency range, perhaps from several megahertz (MHz) to the multi-gigahertz (GHz) range. The antenna 102 may be omni-directional antenna, according to an example embodiment of the invention. The amplifier 104 may be a low-noise amplifier (LNA) and/or a variable gain amplifier (VGA), although other types of amplifiers may be used without departing from example embodiments of the invention. The wavelet pulse generator 106 may include a digital wavelet generator 114, a local oscillator 116, a phase shifter 118 such as a 90° phase shifter, and multipliers 120a and 120b. Analog correlator 108a may include multiplier 122, integrator 124, a store and hold (S/H) circuit 126, an amplifier 128, and an Analog-to-Digital Converter (ADC) 130. Likewise, analog correlator 108b may include multiplier 132, integrator 134, a store and hold (S/H) circuit 136, an amplifier 138, and an Analog-to-Digital Converter (ADC) 140. The timing control 112 may provide timing signals utilized by the wavelet pulse generator 106, the analog correlator 108a, and the analog correlator 108b.

Referring to FIG. 1, the wavelet generator 114 may generate a chain of wavelet bases w(t). As will be described in further detail, the resolution associated with these wavelet bases w(t) may be varied in accordance with example embodiments of the invention. The wavelet bases w(t) may be modulated with carriers, perhaps orthogonal carriers, having a given local oscillator (LO) 116 frequency via respective multipliers 120a and 120b. For example, an example of orthogonal carriers may include I- and Q-sinusoidal carriers $f_{LO}(t)$, according to an example embodiment of the invention. With I- and Q-sinusoidal carriers $f_{LO}(t)$, the I-component signal may be equal in magnitude but 90 degrees out of phase, as provided by the phase shifter 118, with the Q-component signal. The chain of modulated wavelet bases w(t) output by the wavelet pulse generator 106 may be multiplied or otherwise combined with the time-variant input signal x(t) by the respective multipliers 122 and 132 to form an analog correlation output signal that is input into the respective analog integrators 124 and 134. As shown in FIG. 1, the time-variant input signal may optionally be first amplified by the amplifier 104. The analog integrators 124 and 134 determine and then output the respective analog correlation values z(t), which are then digitized using the respective sample and hold circuits 108a, 108b, the amplifiers 128, 138, and the ADCs 130, 140 to generate the respective sampled values $s_{I,k}$ and $s_{Q,k}$. The MAC module 110 may then determine the magnitude $p_k$ of those sampled values $s_{I,k}$ and $s_{Q,k}$ by taking the square-root for those values, as provided by $|p_k|=\sqrt{s_{I,k}^2+s_{Q,k}^2}$, according to an example embodiment of the present invention. If the magnitudes $p_k$ are greater than a certain threshold level, then the MAC module 110 may determine a meaningful interferer reception (e.g., a particular detected spectrum occupancy) in accordance with an embodiment of the present invention.

As will be described in further detail below, the wavelet generator 114 may be embodied in several forms. According to a first embodiment, the wavelet generator 114 may be a multi-point digital wavelet generator. The multi-point digital wavelet generator may adjust the resolution of the generated wavelet bases by adjusting the number of points provided at a constant clocking frequency. Indeed, the number of points may be adjusted by modifying the addressing scheme for the memory that stores the digital wavelet basis data points. On the other hand, according to a second embodiment, the wavelet generator may be a multi-rate digital wavelet generator. The multi-rate digital wavelet generator may adjust the resolution of the generated wavelet bases by providing a constant number of points, but adjusting the clocking frequency.

While each of the multi-point digital wavelet generators and multi-rate digital wavelet generates will be discussed separately below, it will be appreciated that other embodiments may combine aspects of the multi-point and multi-rate digital wavelet generators. For example, a digital wavelet generator in accordance with an example embodiment of the invention may provide for adjusting both the number of points and clocking frequency. Accordingly, while the embodiments below are illustrative, they are not intended to limit to full scope of the invention.

Figure 2A:
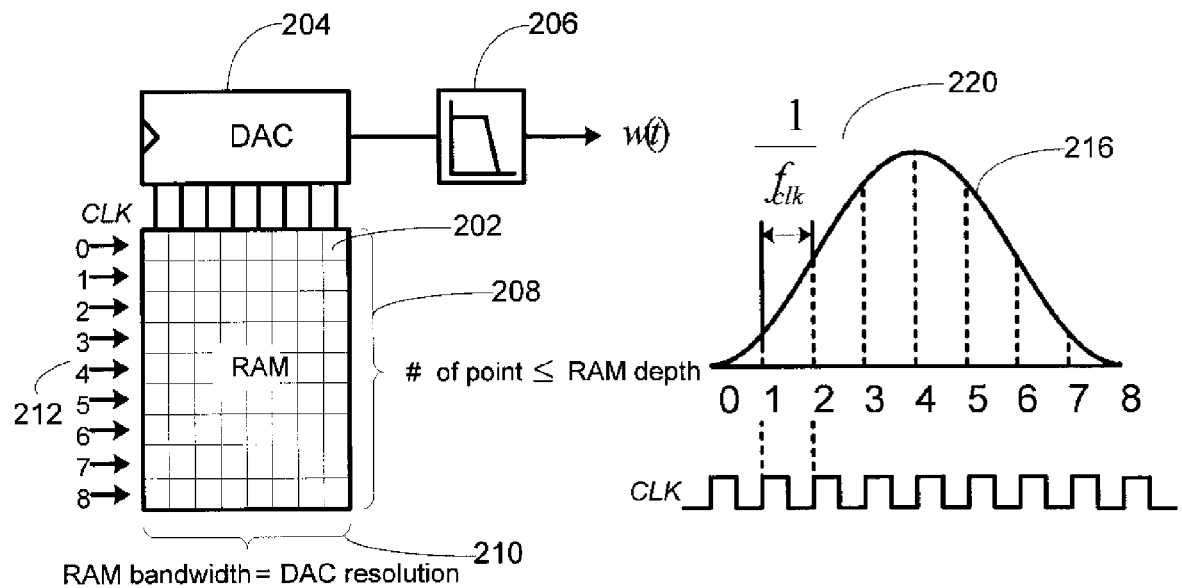
FIGS. 2A and 2B illustrate a Multi-Point Digital Wavelet Generator (MP-DWG), according to an example embodiment of the invention.
Figure 2B:
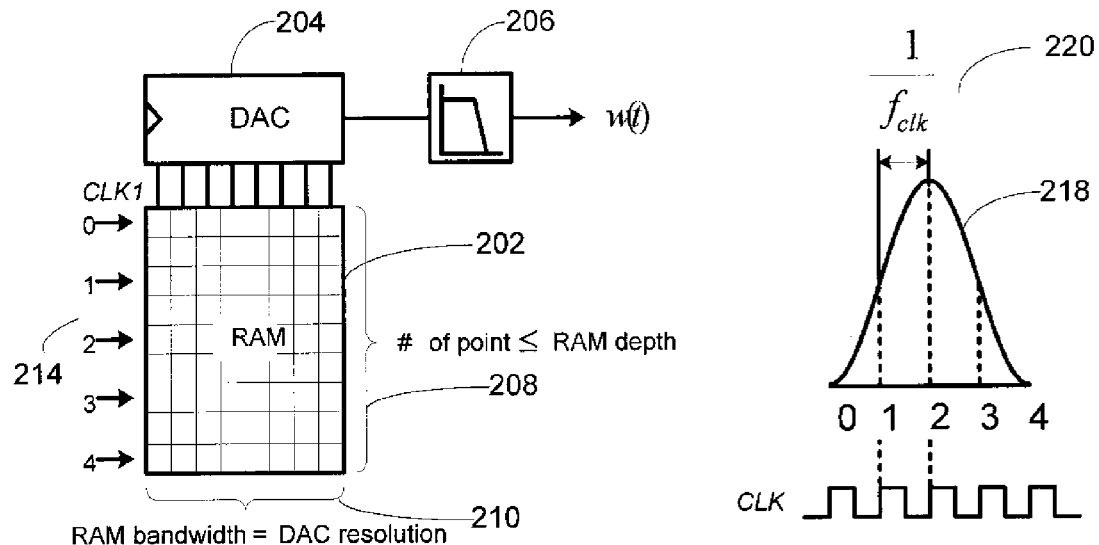

Multi-point Digital Wavelet Generator. According to an example embodiment of the invention, the wavelet generator 114 of FIG. 1 may be implemented according to a multi-point digital wavelet generator (MP-DWG), as illustrated in FIGS. 2A and 2B. More specifically, the multi-point digital wavelet generator may provide for a memory addressing scheme to provide for a precise wavelet basis 216 as illustrated in FIG. 2A or for a more sparse wavelet basis 218 as illustrated in FIG. 2B. The precise wavelet basis 216 of FIG. 2A may have a higher resolution, and thus more points, than the more sparse wavelet basis 218 of FIG. 2B. While the precise and sparse wavelet bases 216, 218 of FIGS. 2A and 2B respectively are illustrative, it will be appreciated that other precise and sparse wavelet bases may include fewer or more points at different frequencies.

As illustrated by FIGS. 2A and 2B, the multi-point digital wavelet generator in accordance with an embodiment of the invention may include a memory 202, a digital-to-analog converter (DAC) 204, and a filter 206. According to an embodiment of the invention, the memory 202 may include one or more forms of random access memory (RAM) or read-only memory (ROM). Alternatively, the memory 202 may include other storage means, including magnetic storage devices like hard drives, removable storage devices, and yet other volatile or non-volatile memory devices. For the digital wavelet generators, the memory 202 may be used to store the digital wavelet basis data points associated with a high-resolution wavelet basis used in generating the wavelet bases w(t). More specifically, points within the high-resolution wavelet basis may stored in respective rows of the memory 202.

During operation of the digital wavelet generator, the digital wavelet basis data points stored in the memory 202 may be output to or otherwise provided to the DAC 204. The DAC 204 may convert the digital wavelet basis data points from a digital form to an analog form. The DAC 204 may then output or otherwise provide the analog wavelet basis to the filter 206, which outputs the resulting analog wavelet bases w(t). According to an embodiment of the invention, the filter 206 may be a reconstruction filter, perhaps a low-pass reconstruction filter, that may construct a smooth analog wavelet basis w(t) from the output of the DAC 204. The selection of the filter 206 and its desired cut-off frequency may depend on the desired resolution of the wavelet bases w(t) and the operating parameters of the DAC 204 and the memory 202.

Each wavelet basis w(t) output by the filter 206 may include an associated horizontal resolution $N_{hor}$ and a vertical resolution $N_{ver}$. The horizontal resolution $N_{hor}$ of the wavelet basis w(t) may be based upon the number of points provided for each wavelet basis w(t). According to an example embodiment of the invention, the maximum horizontal resolution $N_{hor}$ may be based on the depth 208 of the memory 202 (e.g., number of rows) since the depth 208 may limit the number of points that may be stored and retrieved at a particular clock frequency $f_{CLK}$. Accordingly, the depth 208 of the memory 202 may be selected to correspond to the maximum horizontal resolution $N_{hor}$ of the most precise wavelet basis that is desired or required. As provided by FIGS. 2A and 2B, the depth 208 of the memory 202 may be 9 bits corresponding to rows 0 to 8, although other depths may be used in other example embodiments of the invention. It will be appreciated that the horizontal resolution $N_{hor}$ of the wavelet pulse w(t) may also be proportional to the duration of the wavelet bases w(t). For example, longer-duration wavelet bases w(t) may include a larger number of points, and thus have a higher horizontal resolution $N_{hor}$.

The vertical resolution $N_{ver}$ of the wavelet basis w(t)—that is, the frequency of spacing between each point of the wavelet basis w(t)—may be based upon the bandwidth 210 of the memory 202 and the resolution of DAC 204. It will be appreciated the bandwidth 210 of the memory 202 may be equal to the DAC 204 resolution, according to an example embodiment of the invention. As illustrated in FIGS. 2A and 2B, the bandwidth 210 of the memory may be 8 bits, although other bandwidths may be used in other example embodiments of the invention.

Figure 3:
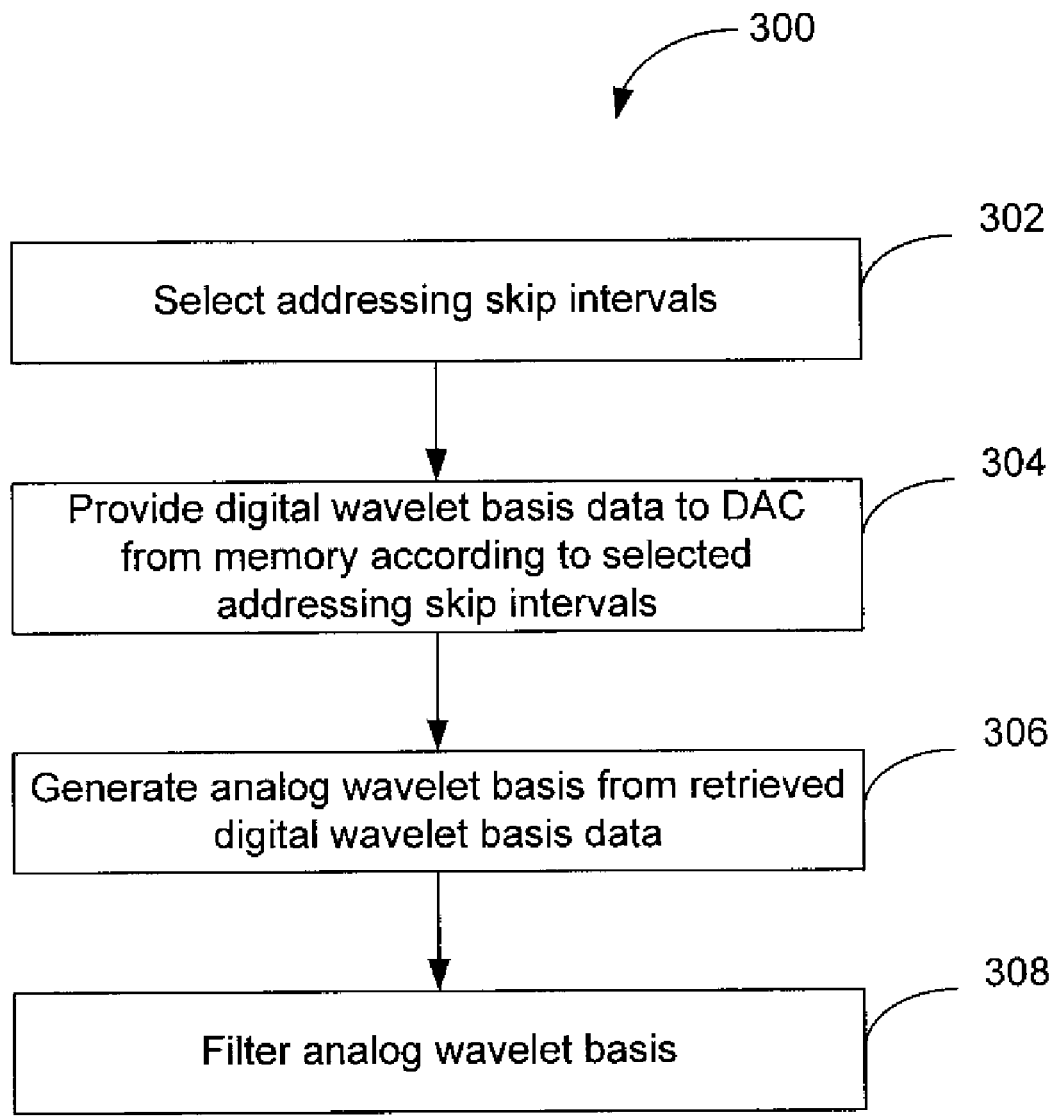
FIG. 3 illustrates an example method for generating wavelet bases using the Multi-Point Digital Wavelet Generator of FIGS. 2A and 2B, according to an example embodiment of the invention.

According to an example embodiment of the invention, and as generally described by the example method 300 of FIG. 3, the resolution of a wavelet basis w(t) may be adjusted by modifying the address skip intervals associated with accessing the wavelet basis data points stored in the memory 202. In step 302, the addressing scheme and in particular, the desired address skip interval, for the memory 202 may be selected or otherwise determined. According to an example embodiment of the invention, the address skip interval may provide for skipping zero or one or more rows (e.g., of the full depth 208) of the memory 202. If one or more rows of the memory 202 are to be skipped, then this skipping rows may be performed in a variety of ways. For example, every other row could be skipped. Alternatively, every second row could be skipped. A variety of other methods for skipping rows are available without departing from embodiments of the invention. In step 304, the DAC 204 retrieves or is otherwise provided with digital wavelet basis data points from memory 202 according to selected addressing skip intervals. For example, in step 304, the digital wavelet basis data points stored in non-skipped rows—that is, the selected or addressed rows—of memory 202 are output or otherwise provided to the DAC 204. In step 306, the DAC 204 may generate the generate the analog wavelet basis from retrieved digital wavelet basis data points. Finally, in step 308, the filter 206, which may be a reconstruction filter, may filter the generated analog wavelet basis according to a predetermined cutoff frequency of the filter 206.

Having described the example method of FIG. 3, the addressing scheme 212 for the precise wavelet basis 216 of FIG. 2A will be described in further detail. For the precise wavelet basis 216, the address skip intervals may be set to skip zero or one or more rows of the memory. According to an example, if all rows of the memory 202 are addressed as provided by addressing scheme 212, then the precise wavelet basis 216 of FIG. 2A may be generated using a horizontal resolution $N_{hor}$ of 9 bits corresponding to each of the rows 0 to 8. More specifically, every row of the memory 202 may be accessed consecutively at a clock access time of $1/f_{clk}$ 220 in accordance with addressing scheme 212. It will be appreciated that the wavelet frequency $f_w$ may be based upon the clock frequency $f_{clk}$ and the horizontal resolution $N_{hor}$ in accordance with $f_{clk}=f_w\cdot(N_{hor}-1)$.

On the other hand, if only a portion of the rows of the memory 202 are addressed at the same rate of $1/f_{clk}$ 220 in accordance with addressing scheme 214, then the sparse wavelet basis 218 of FIG. 2B may be generated. More specifically, as illustrated in FIG. 2B, the sparse wavelet basis 218 may be at twice the wavelet frequency $f_w$ of the wavelet basis 216 of FIG. 2A. In order to generate the wavelet basis 218 at the same clock frequency of $f_{clk}$ but at twice the wavelet frequency $f_w$, the horizontal resolution $N_{hor}$ of the wavelet basis 218 may need to be five rows of the memory 202 according to $f_{clk}=f_w\cdot(N_{hor}-1)$. Therefore, every other row of the memory 202 may accessed at the rate of $1/f_{clk}$ 220 in accordance with addressing scheme 214. For example, if the rate of $1/f_{clk}$ 220 is 125 nsec, then the wavelet frequency $f_w$ may be 1 MHz for the precise wavelet basis 216 and 2 MHz for the sparse wavelet basis 218 in accordance with $f_{clk}=f_w\cdot(N_{hor}-1)$.

As illustrated by FIGS. 2A, 2B, and 3 it will be appreciated that an advantage of the multi-point digital wavelet generator is that variations of sparse and precise wavelet bases may be generated by modifying the memory 202 addressing schemes (e.g., rows 312, 314, etc.) to use all or only a portion of the depth 208 of the memory 202. Indeed, by increasing the addressing skip intervals, one or more variations of the sparse wavelet basis 218 may be obtained. Furthermore, the filter 206, which may be a reconstruction filter, may be set using a particular cut-off frequency since the same sampling frequency $f_{clk}$ is used for any wavelet duration. Furthermore, it will be appreciated that the same memory 202 may be used to generate precise and sparse wavelet bases and no additional memory 202 hardware may be needed for generating precise and sparse wavelet bases. Indeed, as described above, the depth 208 of the memory 202 may be set to be the maximum resolution $N_{hor}$ of the most precise wavelet basis 216 desired. Accordingly, a more sparse wavelet basis 218 may then be obtained by utilizing only a portion of the rows 214, and not the full depth 208 of the memory 202.

Figure 4A:
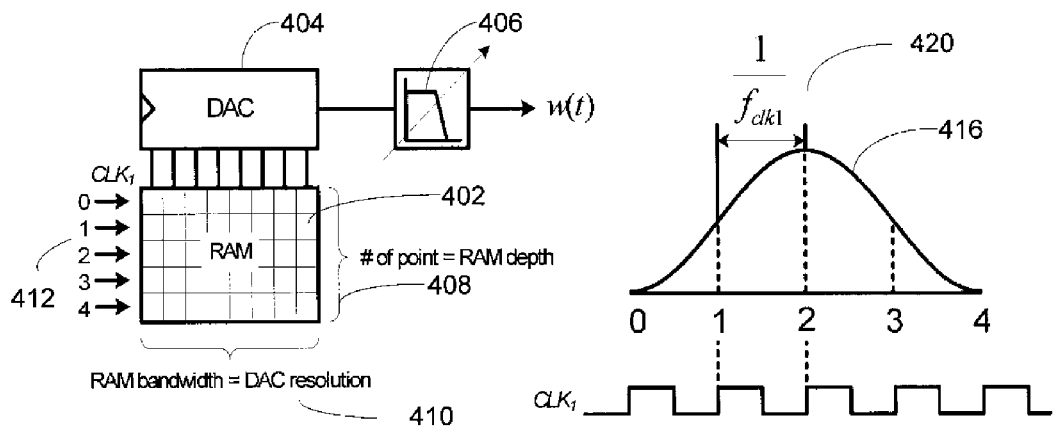
FIGS. 4A and 4B illustrate a Multi-Rate Digital Wavelet Generator (MR-DWG), according to an example embodiment of the proposed invention
Figure 4B:
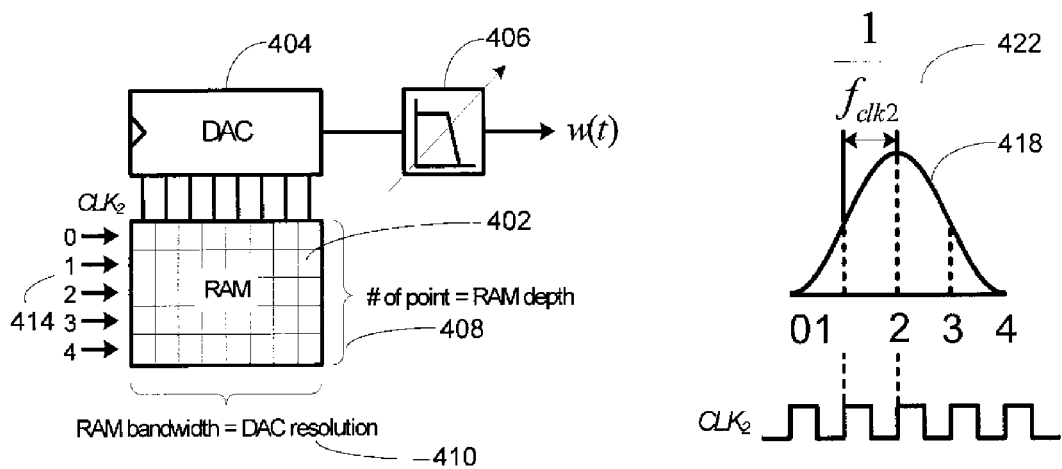

Multi-Rate Digital Wavelet Generator. According to an example embodiment of the invention, the wavelet generator 114 of FIG. 1 may be implemented according to a multi-rate (MR) digital wavelet generator (DWG), as illustrated in FIGS. 4A and 4B. More specifically, the multi-rate digital wavelet generator may provide for adjusting the clocking rate or frequency to provide for a precise wavelet basis 416 as illustrated in FIG. 4A or for a more sparse wavelet basis 418 as illustrated in FIG. 4B.

As illustrated by FIGS. 4A and 4B, the multi-rate digital wavelet generator in accordance with an embodiment of the invention may include a memory 402, a digital-to-analog converter (DAC) 404, and a variable filter 406. According to an embodiment of the invention, the memory 402 may include one or more forms of random access memory (RAM) or read-only memory (ROM). Alternatively, the memory 402 may include other storage means, including magnetic storage devices like hard drives, removable storage devices, and yet other volatile or non-volatile memory devices. The memory 402 may be used to store the digital wavelet basis data points associated with a high-resolution wavelet basis used in generating the wavelet bases w(t). More specifically, points within the high-resolution wavelet basis may stored in respective rows of the memory 402.

During operation of the digital wavelet generator, the digital wavelet basis data points may be output to or otherwise provided to the DAC 404. The DAC 404 may convert the digital wavelet basis data points from a digital form to an analog form. The DAC 404 may then output or otherwise provide the analog wavelet basis to the variable filter 406, which outputs the resulting filtered analog wavelet bases w(t). According to an embodiment of the invention, the variable filter 406 may be a variable reconstruction filter, perhaps a low-pass variable reconstruction filter, that may construct a smooth analog wavelet basis w(t) from the output of the DAC 404. It will be appreciated that the cutoff frequency of the variable filter 406 may be adjusted based upon the clock frequency $f_{CLK}$ associated with the memory 402 and/or DAC 404.

Each wavelet basis w(t) output by the filter 406 may include an associated horizontal resolution $N_{hor}$ and a vertical resolution $N_{ver}$. The horizontal resolution $N_{hor}$ of the wavelet basis w(t) may be based upon the number of points provided for each wavelet basis w(t). For the wavelet bases w(t), the horizontal resolution $N_{hor}$ may be equal to the depth 408 of the memory 402. As illustrated in FIGS. 4A and 4B, the horizontal resolution $N_{hor}$ may be 5 bits (e.g., rows 0 to 4). The vertical resolution $N_{ver}$ of the wavelet basis w(t)—that is, the frequency of spacing between each point of the wavelet basis w(t)—may be adjusted as described below to provide one or more variations of a precise or sparse wavelet basis w(t). Indeed, the vertical resolution $N_{ver}$ may be determined based upon the selected clock frequency $f_{CLK}$.

Figure 5:
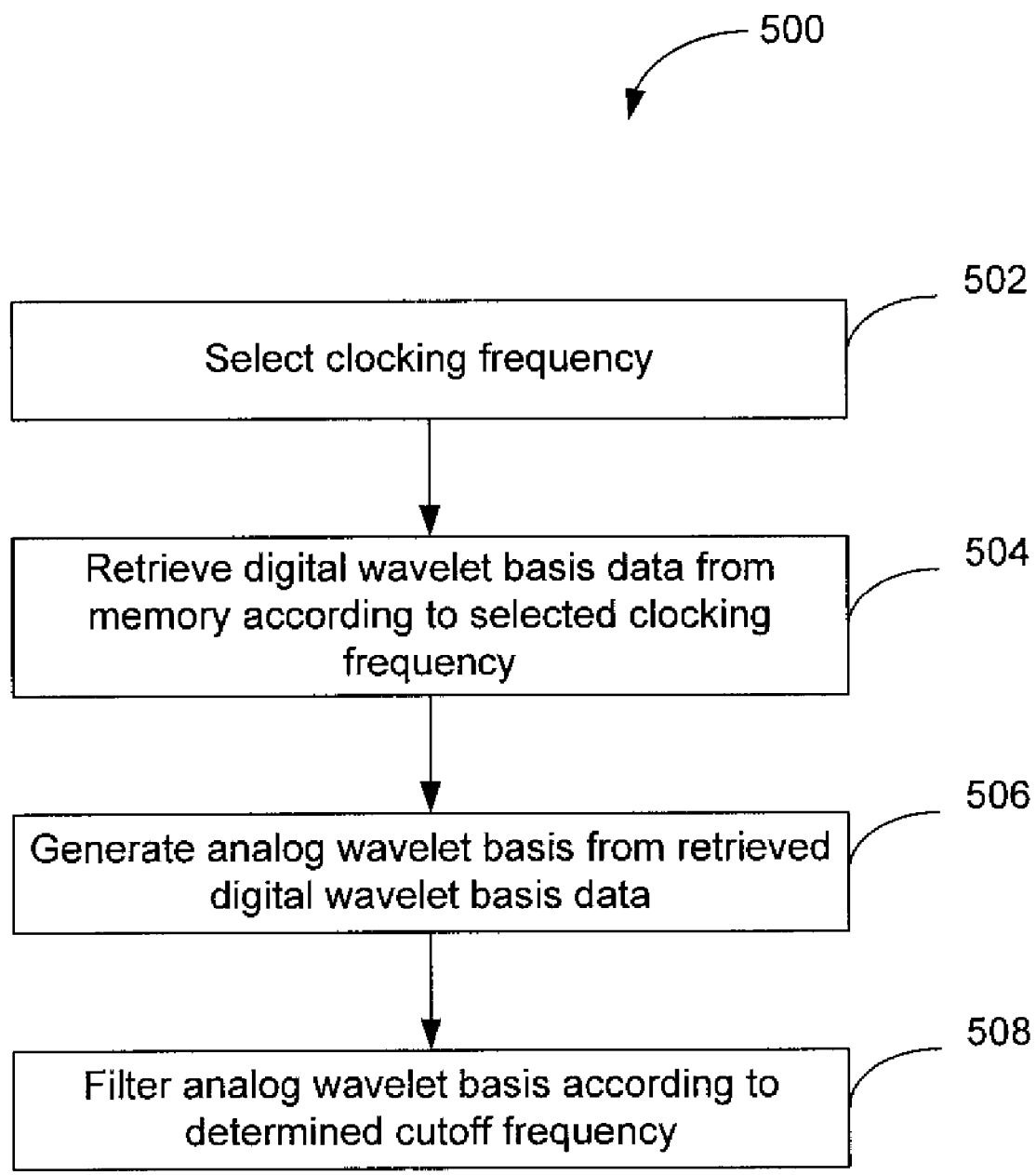
FIG. 5 illustrates an example method for generating wavelet bases using the Multi-Rate Digital Wavelet Generator of FIGS. 4A and 4B, according to an example embodiment of the invention.

According to an example embodiment of the invention, and as generally described by the example method 500 of FIG. 5, the resolution of a wavelet basis w(t) may be adjusted. In step 502, the clock rate $f_{CLK}$ for accessing the wavelet basis data points stored in the memory 402 may be selected. In step 504, the DAC 404 retrieves or is otherwise provided with digital wavelet basis data points from memory 402 according to the selected clock rate $f_{CLK}$. In step 506, the DAC 404 may generate the generate the analog wavelet basis from the retrieved digital wavelet basis data points. Finally, in step 508, the variable filter 406, which may be a variable reconstruction filter 406, may filter the generated analog wavelet basis according to a determined cutoff frequency. In particular, the cutoff frequency for the variable filter 406 may be determined based upon the clock rate $f_{CLK}$ for accessing the basis data points stored in the memory 402.

The adjustment of the clock rate $f_{CLK}$ to generate precise wavelet basis 416 of FIG. 4A and the sparse wavelet basis 418 will now be further discussed in further detail. In FIGS. 4A and 4B, the horizontal resolution $N_{hor}$ of either wavelet bases 416, 418 may the 5 bits. Each row of the memory 402 (i.e., the entire depth 408) may be accessed consecutively, but at different clock rates $f_{CLK}$. In particular, for the precise wavelet basis 416, each row of the memory 402 may be accessed according to a first clock access time of $1/f_{clk1}$ 420. On the other hand, for the sparse wavelet basis 418, each row of the memory 402 may be accessed according to a second clock access time of $1/f_{clk1}$ 422. For example, the second clock access time of $1/f_{clk2}$ 422 for the sparse wavelet basis 418 may be set to be half of the first clock access time of $1/f_{clk1}$ 420 for the precise wavelet basis 416. In this situation, the wavelet frequency $f_w$ of the sparse wavelet basis 418 may be at twice the wavelet frequency $f_w$ of the precise wavelet basis 416, given a horizontal resolution $N_{hor}$ 5 bits for both cases. For example, if the wavelet frequency $f_w$ is assumed to be 1 MHz for the precise wavelet basis 416 and 2 MHz for the sparse wavelet basis 418, then the first clock access time of $1/f_{clk1}$ 420 is 250 nsec and the second clock access time of $1/f_{clk2}$ 422 is 125 nsec in accordance with $f_{clk}=f_w \cdot (N_{hor}-1)$. Accordingly for the precise wavelet basis 416, the clock access time may be prolonged while for the sparse wavelet basis 418, the clock access time may be shortened.

It will be appreciated that for the multi-rate digital wavelet generator, the horizontal resolution $N_{hor}$ is the same for any wavelet duration. Therefore, the memory 402 may be accessed consecutively, as illustrated by memory addressing scheme 412, 414. Instead, it is the clock rate $f_{clk}$ that is changed when generating the precise wavelet basis 416 and the sparse wavelet basis 418. Accordingly, the multi-rate digital wavelet generator may modify the duration of wavelet basis by adjusting the clock access time.

An advantage of the multi-rate digital wavelet generator may be that the depth 408 of the memory 402 may be optimally sized. Because the horizontal resolution $N_{hor}$ of each wavelet basis is same for all wavelet bases, there is no redundancy in memory 402 required. In addition, a simple address accessing scheme 412, 414 may be utilized.

Comparison of Results. FIG. 6 illustrates the table of comparison results between the multi-point digital wavelet generators (MP-DWG) and multi-rate digital wavelet generators (MR-DWG). It will be appreciated that the hardware burden for the reconstruction filter 206 for MP-DWG is less than for the variable reconstruction filter 406 for MR-DWG. On the other hand, the hardware burden for the memory 202 for MP-DWG is greater than for the memory 402 for the MR-DWG.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for a multi-point digital wavelet generator, comprising:
   storing each of a plurality of digitized data points of a high-resolution wavelet basis in one of a plurality of rows of a memory;
   determining skipped rows and non-skipped rows of the plurality of rows of the memory based upon an address skip interval;
   retrieving digitized data points from each non-skipped row of the memory; and
   processing the retrieved digitized data points from each non-skipped row in accordance with a clock frequency to generate an analog wavelet basis, wherein a duration of the analog wavelet basis is determined based at least in part upon the address skip interval and the clock frequency.

2. The method of claim 1, wherein the plurality of rows of the memory are addressed sequentially, and wherein even-address rows are determined to be the skipped rows and odd-address rows are determined to be the non-skipped rows.

3. The method of claim 1, wherein no row is determined to be a skipped row of the plurality of rows.

4. The method of claim 1, wherein processing the retrieved digitized data points includes a digital-to-analog converter (DAC) converting the retrieved digitized data points into the analog wavelet basis.

5. The method of claim 1, wherein as the number of skipped rows increases in accordance with address skip interval, the duration of the analog wavelet basis decreases.

6. The method of claim 1, further comprising filtering the analog wavelet basis with a reconstruction filter having a predetermined cutoff frequency.

7. The method of claim 1, wherein the memory includes at least one of random access memory (RAM) or read-only memory (ROM).

8. A method for a multi-rate digital wavelet generator, comprising:
- storing each of a plurality of digitized data points of a high-resolution wavelet basis in one of a plurality of rows of a memory;
- determining a clock frequency;
- retrieving digitized data points from each row of the memory; and
- sequentially processing the retrieved digitized data points from each row in accordance with the determined clock frequency to generate an analog wavelet basis, wherein the duration of the analog wavelet basis decreases as the clock frequency increases.

9. The method of claim 8, further comprising filtering the analog wavelet basis with a variable reconstruction filter having a variable cutoff frequency.

10. The method of claim 9, wherein the variable cutoff frequency is adjusted according to the determined clock frequency.

11. The method of claim 8, wherein the memory includes at least one of random access memory (RAM) or read-only memory (ROM).

12. A multi-point digital wavelet generator, comprising:
- a memory for storing each of a plurality of digitized data points of a high-resolution wavelet basis in one of a plurality of rows of a memory;
- an addressing scheme having an address skip interval, wherein the address skip interval determines skipped rows and non-skipped rows of the plurality of rows of the memory; and
- a digital-to-analog converter (DAC) that receives digitized data points from each non-skipped row of the memory, wherein the DAC processes the received digitized data points from each non-skipped row in accordance with a clock frequency to generate an analog wavelet basis, wherein a duration of the analog wavelet basis is determined based at least in part upon the address skip interval and the clock frequency.

13. The multi-point digital wavelet generator of claim 12, wherein the plurality of rows of the memory are addressed sequentially, and wherein even-address rows are determined to be the skipped rows and odd-address rows are determined to be the non-skipped rows.

14. The multi-point digital wavelet generator of claim 12, wherein no row is determined to be a skipped row of the plurality of rows.

15. The multi-point digital wavelet generator of claim 12, wherein as the number of skipped rows increases in accordance with the address skip interval, the duration of the analog wavelet basis decreases.

16. The multi-point digital wavelet generator of claim 12, further comprising a reconstruction filter having a predetermined cutoff frequency that filters the analog wavelet basis.

17. The multi-point digital wavelet generator of claim 12, wherein the memory includes at least one of random access memory (RAM) or read-only memory (ROM).

18. A multi-rate digital wavelet generator, comprising:
- a memory for storing each of a plurality of digitized data points of a high-resolution wavelet basis in one of a plurality of rows of the memory;
- a clock having a selectable clock frequency; and
- a digital-to-analog (DAC) converter that receives the digitized data points from each row of the memory, wherein the DAC sequentially processes the received digitized data points from each row in accordance with the selected clock frequency to generate an analog wavelet basis, wherein the duration of the analog wavelet basis decreases as the clock frequency increases.

19. The multi-rate digital wavelet generator of claim 18, further comprising a reconstruction filter that filters the analog wavelet basis according to a selectable cutoff frequency, wherein the cutoff frequency is selected based at least in part upon the selected clock frequency.

20. The multi-rate digital wavelet generator of claim 18, wherein the memory includes at least one of random access memory (RAM) or read-only memory (ROM).

* * * * *